US 6,717,370 B2

(12) United States Patent
Van Der Veen

(10) Patent No.: US 6,717,370 B2
(45) Date of Patent: Apr. 6, 2004

(54) HIGH SPEED STOP CIRCUIT FOR AN ELECTRONIC BALLAST

(75) Inventor: Geert Willem Van Der Veen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/225,796

(22) Filed: Aug. 22, 2002

(65) Prior Publication Data

US 2003/0038601 A1 Feb. 27, 2003

(30) Foreign Application Priority Data

Aug. 27, 2001 (EP) ............................................. 01203229

(51) Int. Cl.[7] ............................................... H05B 37/00
(52) U.S. Cl. ....................... 315/224; 315/225; 315/307
(58) Field of Search ................................ 315/224, 225, 315/307, 308, 291, 209 R, 247, 244, 219

(56) References Cited

U.S. PATENT DOCUMENTS

| 4,949,016 A | * | 8/1990 | De Biji et al. ............... 315/224 |
| 5,075,602 A | * | 12/1991 | Overgoor et al. ........... 315/307 |
| 5,148,097 A | * | 9/1992 | Draxelmayr ................. 315/291 |
| 5,670,849 A | * | 9/1997 | Melai .......................... 315/307 |
| 5,751,115 A | | 5/1998 | Jayaraman et al. ......... 315/225 |
| 5,883,473 A | | 3/1999 | Li et al. ...................... 315/225 |
| 6,005,354 A | | 12/1999 | Houk .......................... 315/225 |
| 6,008,593 A | | 12/1999 | Ribarich ...................... 315/307 |
| 6,111,368 A | | 8/2000 | Luchaco ...................... 315/307 |
| 6,392,361 B2 | * | 5/2002 | Van Der Veen et al. . 315/209 R |

FOREIGN PATENT DOCUMENTS

WO   WO 01/37617   5/2001   ......... H05B/41/298

* cited by examiner

Primary Examiner—Wilson Lee

(57) ABSTRACT

In an electronic ballast equipped with a high-frequency bridge circuit, a microprocessor for controlling lamp operation and a stop circuit for interrupting the operation of the ballast in case of a fault condition, the stop circuit interrupts both the operation of the bridge circuit and the operation of the microprocessor. Unstable operation of the ballast caused by the fault condition is prevented thereby.

16 Claims, 1 Drawing Sheet

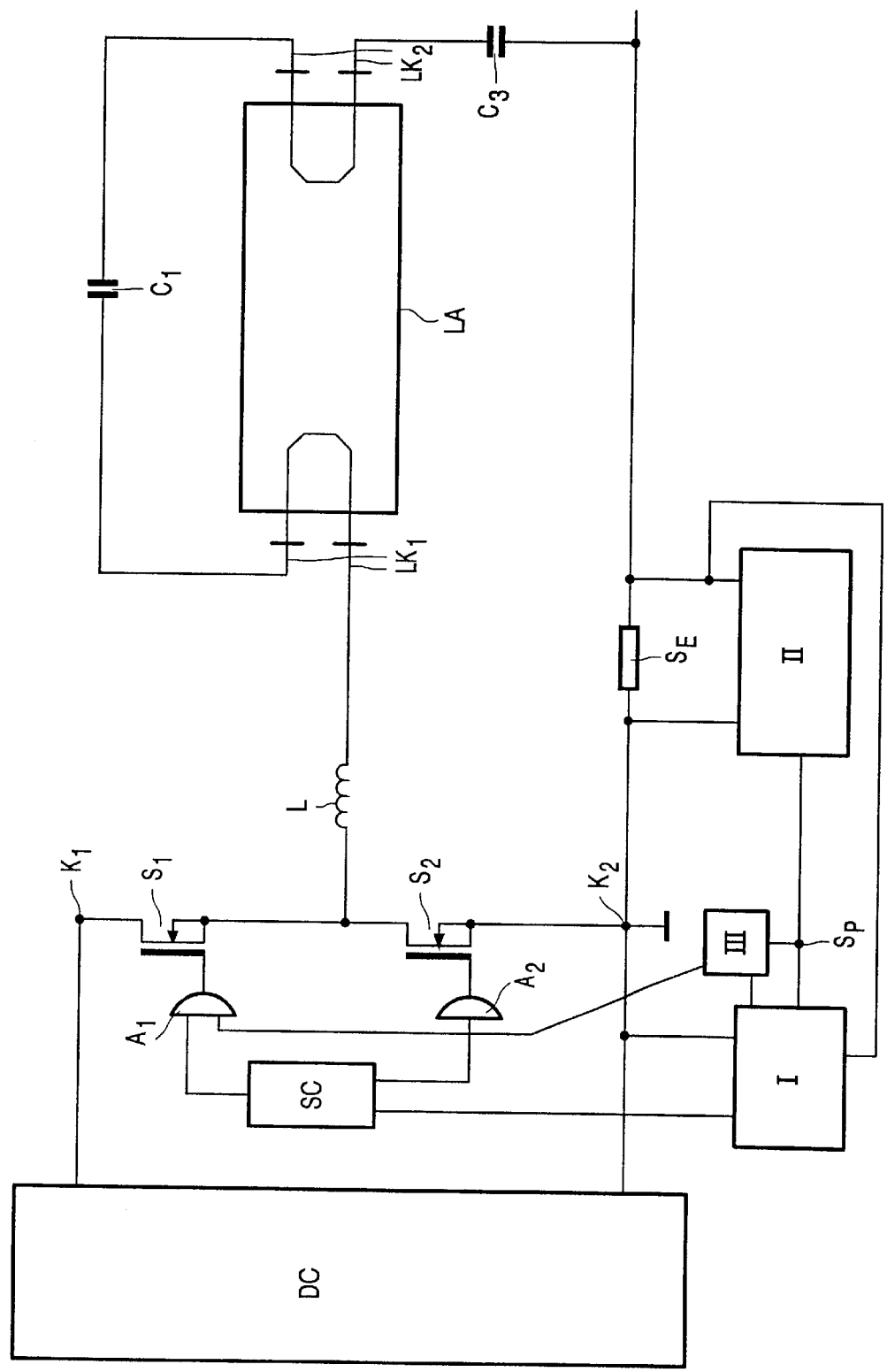

HIGH SPEED STOP CIRCUIT FOR AN ELECTRONIC BALLAST

The invention relates to a circuit arrangement for feeding a lamp, which is equipped with
- input terminals that are to be connected to a supply voltage source,
- a power circuit coupled to the input terminals and provided with at least one switching element for generating a lamp current at a frequency f from a supply voltage supplied by the supply voltage source,
- a drive circuit coupled to a control electrode of the switching element for generating a drive signal for rendering the switching element alternately conducting and non-conducting at a frequency f,
- a control circuit that comprises a microprocessor and is coupled to the power circuit and to the drive circuit for controlling a lamp quantity,
- a protection circuit coupled to the power circuit and to the drive circuit for blocking the drive of the switching element.

BACKGROUND OF THE INVENTION

Such a circuit arrangement is known. The lamp quantity that is controlled may be, for example, the wattage of the lamp or the lamp current. Such a lamp quantity is frequently controlled by setting the frequency and/or the duty cycle of the drive signal. The protection circuit is intended to preclude damage to the circuit arrangement and/or the lamp caused by high voltages and/or currents. Such high voltages and currents may occur, for example, if no lamp is connected to the circuit arrangement, or if the connected lamp is defective. The protection circuit precludes such damage by rendering the circuit arrangement non-conducting if such high voltages and currents occur. As a result, the power circuit stops generating these high voltages and currents substantially immediately. Consequently, the circuit arrangement is effectively protected.

A drawback of the known circuit arrangement resides, however, in that after the power circuit has stopped operating, the microprocessor in the control circuit continues operating for some time. For example, it is possible that the operation of the power circuit is interrupted by the protection circuit for a short period of time only because the amplitudes of currents and voltages have decreased to such extent within this short period of time that a further interruption is not necessary. During the period of time that the operation of the power circuit is interrupted, however, the actual value of the lamp quantity controlled by the control circuit changes dramatically, so that the control circuit also dramatically changes the duty cycle and/or frequency of the drive signal. For this reason, for example, the power supplied to the lamp immediately after the protection circuit has stopped blocking the drive of the switching element may be much too high. This results in unstable operation of the lamp causing, for example, flickering etc. Flickering may also be caused by the fact that the lamp goes out as a result of the short interruption of the power circuit by the protection circuit, and subsequently goes on again. In principle, this problem could be circumvented if the protection circuit, instead of directly blocking the drive of the switching element, would order the microprocessor to stop, after which said microprocessor stops controlling the lamp quantity and, subsequently, also renders the drive circuit inoperative. Stopping the microprocessor and hence also rendering the drive circuit inoperative, however, takes so much time that the high currents and voltages in the power circuit would already have caused damage by the time the operation of the power circuit is interrupted.

THE SUMMARY OF THE INVENTION

It is an object of the invention to provide a circuit arrangement for feeding a lamp, wherein the circuit arrangement is effectively protected against high currents and voltages in the power circuit by means of a protection circuit, and wherein the operation of this protection circuit does not give rise to unstable operation of the lamp.

To achieve this, a circuit arrangement of the type mentioned in the opening paragraph is characterized in that the protection circuit is additionally coupled to the control circuit for interrupting the operation of the control circuit via the microprocessor, and in that the protection circuit blocks the drive of the switching element until the operation of the control circuit is interrupted. It is to be noted that the protection circuit and the control circuit can alternatively be coupled via the drive circuit.

In a circuit arrangement in accordance with the invention, if high currents and high voltages occur in the power circuit, the operation of said power circuit is interrupted via the drive circuit so rapidly that the high voltages and currents cannot cause damage to the circuit arrangement and/or the lamp. In addition, the operation of the control circuit is interrupted via the microprocessor in that the software of the microprocessor renders the control loop inoperative. The operation of the power circuit remains interrupted until the operation of the control circuit is interrupted. This can be achieved in various ways, for example in that the protection circuit starts a timer, and the drive of the switching element remains interrupted until after a time interval determined by the timer has elapsed. Alternatively, it is possible, for example, to make the protection circuit change a memory content from a first value to a second value, and make the microprocessor reverse this change after the interruption of the operation of the control loop. In the latter method, the drive of the switching element is interrupted for as long as the second value is present in the memory. As the protection circuit simultaneously initiates the interruption of the operation of the control circuit and the interruption of the operation of the power circuit, unstable operation of the lamp is precluded. In a circuit arrangement as described in the opening paragraph, the microprocessor frequently not only plays a part during stationary lamp operation in controlling the lamp quantity, but also enables, prior to this stationary lamp operation, the lamp electrodes to be pre-heated and, subsequently, an ignition voltage to be generated. These different functions of the microprocessor are carried out by different software. In such a case, after the software responsible for forming the control loop has been rendered inoperative and, if, for example, it has been detected that a new lamp is connected to the power circuit, the microprocessor is capable of making sure, by means of different software, that these different stages in the operation are successively carried out.

Satisfactory results were obtained using embodiments of a circuit arrangement in accordance with the invention wherein the lamp quantity is selected among the group formed by the lamp current and the lamp power.

It was found to be advantageous to cause the operation of the microprocessor to be interrupted by the protection circuit through the generation of an interrupt. It is alternatively possible to cause the value of a status bit to be changed by the protection circuit, so that the operation of the microprocessor is interrupted.

It has been found that the protection circuit can block the drive of the switching element in a comparatively simple way by interrupting the connection between the drive circuit and the control electrode of the switching element.

It has also been found that the drive circuit and the control circuit advantageously form part of an integrated circuit provided with a stop-pin and, advantageously, the output of the protection circuit is coupled via this stop-pin to the microprocessor and to the drive circuit.

BRIEF DESCRIPTION OF THE DRAWING

An example of the invention will be explained in greater detail with reference to a drawing.

In the drawing, FIG. 1 shows an example of a circuit arrangement in accordance with the invention to which a lamp LA is connected.

DETAILED DESCRIPTION OF THE PREFERRED EMBODIMENT

In FIG. 1, K1 and K2 are input terminals that are to be connected to a supply voltage source. Input terminals K1 and K2 are connected to respective ends of circuit part DC for generating a substantially constant DC voltage from a low-frequency AC voltage. Such a low-frequency AC voltage is delivered, for example, by the mains (mains supply). The mains and the circuit part DC jointly form a supply voltage source that delivers a supply voltage that is a substantially constant DC voltage. Input terminals K1 and K2 are connected together by means of a series arrangement of two switching elements S1 and S2. A control electrode of switching element S1 is connected to an output of AND-gate A1. A first input of AND-gate A1 is connected to a first output of circuit part SC. Circuit part SC is a drive circuit for generating a drive signal for alternately rendering switching element S1 and switching element S2 conducting and non-conducting at a frequency f. A second output of circuit part SC is connected to a first input of AND-gate A2. An output of AND-gate A2 is connected to a control electrode of switching element S2. Switching element S2 is shunted by a series arrangement of coil L, lamp terminal LK1, lamp LA, lamp terminal LK2, capacitor C3 and sensor resistor SE. The lamp LA is shunted by a capacitor C1. Switching elements S1 and S2, coil L, lamp terminals LK1 and LK2, capacitors C1 and C3 and sensor resistor SE jointly form a power circuit for generating a lamp current having a frequency f from a supply voltage. A first end of sensor resistor SE is connected to a first input of circuit part I and a first input of circuit part II. A second end of sensor resistor SE is connected to a second input of circuit part I and a second input of circuit part II. Circuit part I is a control circuit for controlling a lamp quantity which, in this example, is formed by the lamp current. To this end, circuit part I comprises a microprocessor which is not shown in FIG. 1. An output of circuit part I is connected to an input of circuit part SC. Circuit part II is a protection circuit for interrupting the drive of the switching elements S1 and S2 and for interrupting the operation of the control circuit via the microprocessor. An output of circuit part II is connected, for this purpose, to a third input of circuit part I and, via circuit part III, to a second input of AND-gate A1 and to a second input of AND-gate A2. Circuit part III is a memory. A first input of circuit part III is connected to the output of circuit part II. A second input of circuit part III is connected to a further output of circuit part I. An output of circuit part III is connected to the second input of AND-gate A1 and to the second input of AND-gate A2. Drive circuit SC, AND-gates A1 and A2, circuit part I and circuit part III are integrated in an IC. This IC is equipped with a stop-pin SP that is situated between the output of circuit part II and the third input of circuit part I.

Next, a description is given of the operation of the example shown in FIG. 1.

If the circuit part DC is connected to the mains voltage, a substantially constant DC voltage is present between the input terminals K1 and K2. The voltage at the output of circuit part III is high. The circuit part SC renders the switching elements S1 and S2 alternately conducting and non-conducting at a frequency f. As a result, a substantially square-wave voltage of frequency f is present at a junction point of switching element S1 and switching element S2. As a result of this substantially square-wave voltage, an alternating current of frequency f flows in the load branch formed by coil L, lamp La, capacitors C1 and C3 and sensor SE. The voltage across the sensor resistor SE is a measure of the amplitude of this current and hence also of the amplitude of the lamp current. Circuit part I controls the lamp current by setting the frequency and/or the duty cycle of the drive signal in dependence upon the amplitude of the voltage across sensor resistor SE. During normal stationary (stable) lamp operation, the amplitude of the voltage across the sensor resistor SE is smaller than a predetermined reference value, and the voltage at the output of circuit part II is high. If the lamp LA temporarily carries no or less current due to a defect, then the amplitude of the current in the other components of the load branch increases substantially. This increase leads to an increase of the amplitude of the voltage across the sensor resistor SE. If the amplitude is higher than the predetermined reference value, then the output of circuit part II and hence the voltage on the stop-pin SP becomes low. As a result, the content of the memory formed by circuit part III changes and the voltage at the output of circuit part III also becomes low. Also the output of the two AND-gates becomes low so that the switching elements S1 and S2 both become non-conducting. As a result, the power circuit stops generating the high current substantially immediately, which high current could cause damage to the circuit arrangement. In addition, the circuit part I stops controlling the lamp current. As a result, instabilities such as "flickering" are precluded. The microprocessor accommodated in circuit part I changes the voltage at the second input of circuit part III after the control procedure has ended, as a result of which the content of the memory formed by circuit part III changes and the voltage at the output of circuit part III becomes high again. From that moment, the drive of the switching elements S1 and S2 is no longer interrupted. If it has been detected, for example, that a new lamp is connected to the power circuit, the microprocessor can bring about that, in succession, the electrodes of the lamp are pre-heated and an ignition voltage is generated, after which a stationary power supply to the lamp is possible again. During this stationary power supply, the lamp current is adjusted by the microprocessor so as to be at a substantially constant value.

What is claimed is:

1. A circuit arrangement for feeding a lamp, the circuit arrangement comprising:

input terminals that are to be connected to a supply voltage source, a power circuit coupled to the input terminals and provided with at least one switching element for generating a lamp current at a frequency f from a supply voltage supplied by the supply voltage source, a drive circuit coupled to a control electrode of the switching element for generating a drive signal for rendering the switching element alternately conducting and non-conducting at the frequency f, a control circuit that comprises a microprocessor and is coupled to the power circuit and to the drive circuit for controlling a lamp quantity, and a protection circuit coupled to the power circuit and to the drive circuit for blocking the drive of the switching element, characterized in that the protection circuit is additionally coupled to the control circuit for interrupting the operation of the control circuit via the microprocessor, and in that the protection circuit blocks the drive of the switching element until the operation of the control circuit is interrupted.

2. A circuit arrangement as claimed in claim 1, wherein the lamp quantity is selected among the group formed by the lamp current and the lamp power.

3. A circuit arrangement as claimed in claim 1, wherein the protection circuit interrupts the operation of the microprocessor by generating an interrupt.

4. A circuit arrangement as claimed in claim 1, wherein the protection circuit interrupts the operation of the microprocessor by changing the value of a status bit.

5. A circuit arrangement as claimed in claim 1, wherein the protection circuit blocks the drive of the switching element by interrupting the coupling between the drive circuit and the control electrode of the switching element via a circuit path exclusive of the control circuit.

6. A circuit arrangement as claimed in claim 1, wherein the drive circuit and the control circuit form part of an integrated circuit equipped with a stop-pin, and wherein an output of the protection circuit is coupled via said stop-pin to an input of the microprocessor and to an input of the drive circuit.

7. The circuit arrangement as claimed in claim 1 wherein the protection circuit is coupled to the power circuit via a first circuit path and is coupled to the control circuit via a second separate circuit path.

8. The circuit arrangement as claimed in claim 1 wherein the protection circuit applies an interrupt signal to the power circuit and to the control circuit substantially simultaneously, and blocking of the drive of the switching element occurs before interruption of the operation of the control circuit.

9. A circuit arrangement for operating a discharge lamp comprising:

first and second input terminals for connection to a source of supply voltage for the operating circuit, a power circuit coupled to the input terminals and including at least one control LED switching element for generating a lamp current, a drive circuit coupled to a control electrode of the switching element for generating a drive signal for rendering the switching element alternately conducting and non-conducting at a frequency f, a control circuit coupled to the drive circuit for controlling a lamp quantity as a function of the lamp quantity, and a protection circuit coupled to the power circuit and to the control circuit via separate circuit paths, the protection circuit being operative to generate an interrupt signal for blocking the drive of the switching element and for interrupting operation of the control circuit, wherein the protection circuit blocks the drive of the switching element until the operation of the control circuit is interrupted.

10. The lamp operating circuit as claimed in claim 9 wherein the protection circuit blocks the drive of the switching element by interrupting the coupling between the drive circuit and the control electrode of the switching element via a circuit path exclusive of the control circuit.

11. The lamp operating circuit as claimed in claim 9 wherein the drive circuit is coupled to the control electrode of the switching element via logic circuit controlled in response to the interrupt signal so as to block the drive of the switching element.

12. The lamp operating circuit as claimed in claim 9 wherein the lamp quantity is lamp current and the interrupt signal is generated upon the occurrence of an abnormal condition in the power circuit.

13. The lamp operating circuit as claimed in claim 9 wherein the input terminals are intended for connection to a source of DC supply voltage.

14. The lamp operating circuit as claimed in claim 9 wherein the control circuit includes a microprocessor for controlling ignition and operation of the discharge lamp.

15. The lamp operating circuit as claimed in claim 9 wherein the interrupt signal is applied to the power circuit and to the control circuit substantially simultaneously, and blocking of the drive of the switching element occurs before interruption of the operation of the control circuit.

16. The lamp operating circuit as claimed in claim 9 wherein the power circuit includes a ballast inductor connected in series with the discharge lamp.

* * * * *